United States Patent
Laserson et al.

(10) Patent No.: US 11,900,395 B2
(45) Date of Patent: Feb. 13, 2024

(54) DATA-DRIVEN SEGMENTATION AND CLUSTERING

(71) Applicant: NCR Voyix Corporation, Atlanta, GA (US)

(72) Inventors: Itamar David Laserson, Givat Shmuel (IL); Mor Zimerman Nusem, Even (IL)

(73) Assignee: NCR Voyix Corporation, Atlanta, GA (US)

(*) Notice: Subject to any disclaimer, the term of this patent is extended or adjusted under 35 U.S.C. 154(b) by 0 days.

(21) Appl. No.: 16/773,048

(22) Filed: Jan. 27, 2020

(65) Prior Publication Data
US 2021/0233101 A1    Jul. 29, 2021

(51) Int. Cl.
*G06Q 30/00*        (2023.01)
*G06Q 30/0201*      (2023.01)
*G06Q 30/0207*      (2023.01)
*G06N 20/00*        (2019.01)
*G06F 18/23213*     (2023.01)

(52) U.S. Cl.
CPC ... *G06Q 30/0201* (2013.01); *G06F 18/23213* (2023.01); *G06N 20/00* (2019.01); *G06Q 30/0224* (2013.01)

(58) Field of Classification Search
CPC ........... G06Q 30/0224; G06Q 30/0201; G06N 20/00; G06K 9/6223
See application file for complete search history.

(56) References Cited

U.S. PATENT DOCUMENTS

| | | | |
|---|---|---|---|
| 2017/0140384 A1* | 5/2017 | Zoldi | G06Q 20/4016 |
| 2018/0089737 A1* | 3/2018 | Ali | G06Q 30/0255 |
| 2018/0211330 A1* | 7/2018 | Ran | G06Q 40/12 |
| 2019/0392501 A1* | 12/2019 | Kumaresan Nair | G06Q 30/0631 |
| 2020/0311113 A1* | 10/2020 | Gao | G06F 16/35 |

OTHER PUBLICATIONS

Haddad; A Data-Driven Approach for the Temporal Segmentation of Eeg; IEEE-Emb; pp. 1492-1446; May 2019.*
BMC Medical; 12 pages; Yan; A systematic review of data-driven population segmentation analysis; 12 pages; 2018.*

* cited by examiner

*Primary Examiner* — Radu Andrei
(74) *Attorney, Agent, or Firm* — Schwegman Lundberg & Woessner, P.A.

(57) ABSTRACT

Item codes are mapped to multidimensional space as item vectors based on each item codes context relevant to other item codes in a product catalogue. A transaction history for a given customer is obtained and each item vector associated with a corresponding item purchase made by that customer is obtained. All item vectors per customer are summed to create an aggregated and single vector representing the purchase history of each customer. The aggregated customer-item vectors for the customers are plotted in the multidimensional space. The plotted customer-item vectors are then clustered into groupings based on their distances from one another in the multidimensional space; the groupings representing data-driven customer segments. The data-driven customer segments along with customer identifiers for the customers comprising each segment are provided as input to promotional engines and/or loyalty systems.

18 Claims, 4 Drawing Sheets

DATA-DRIVEN SEGMENTATION AND CLUSTERING

BACKGROUND

Customer segmentation is an essential tool for retailers worldwide. A marketer's goal is to effectively match an offer to a customer and effective customer segments are essential for achieving the match. Current solutions are mostly manual and rely heavily on presumptions.

Typical, customer segmentation is based on a "rules-based" approach, where the segments are assumed or defined first, and customers are then assigned to the pre-defined segments based on application of custom rules. For example, if a customer's spending amount suggests that over 33% of the purchases are of meat-based products, then the customer is assigned or associated with a predefined "meat-loving" customer segment.

These solutions often produce non-optimal results where the variance between a given segment's members is high. As a result, retailers eventually lose millions of dollars in lost sales due to the sub-optimal approaches deployed within the industry.

In addition, the current approaches require predefined segments and user-defined rules for associating a customer with a given segment based on the rules. The predefined segments are based on manual analysis of data, which requires substantial analytics and time that must be invested by analysts. The segments are not usually dynamic and changing; rather changes are achieved based on manual observations and subsequent manual analysis. Consequently, the segments are effectively static. Furthermore, once a segment is decided upon, specific rules have to be defined and implemented (which may require assistance of a programmer) and the customer data must be processed to make the associations between customers and the segment based on the specific rules.

SUMMARY

In various embodiments, methods and a system for data-driven segmentation and clustering are presented.

According to an aspect, a method for data-driven segmentation and clustering is presented. Specifically, item codes for items of a product catalogue are transformed into item vectors plotted into a multidimensional space. Transaction histories are obtained for customers. Transaction item vectors are identified for transaction items of the transaction histories on a per customer basis based on the item codes and the item vectors. The transaction item vectors are summed per customer and an aggregate consumer-item vector is produced, the aggregate consumer-item vector that is plotted within the multidimensional space per customer. The aggregate consumer-item vectors for the customers are clustered from the multidimensional space and customer groupings are produced as segments. The segments are provided through an Application Programming Interface (API) to a promotion engine and/or a loyalty system.

DETAILED DESCRIPTION

Figure 1:
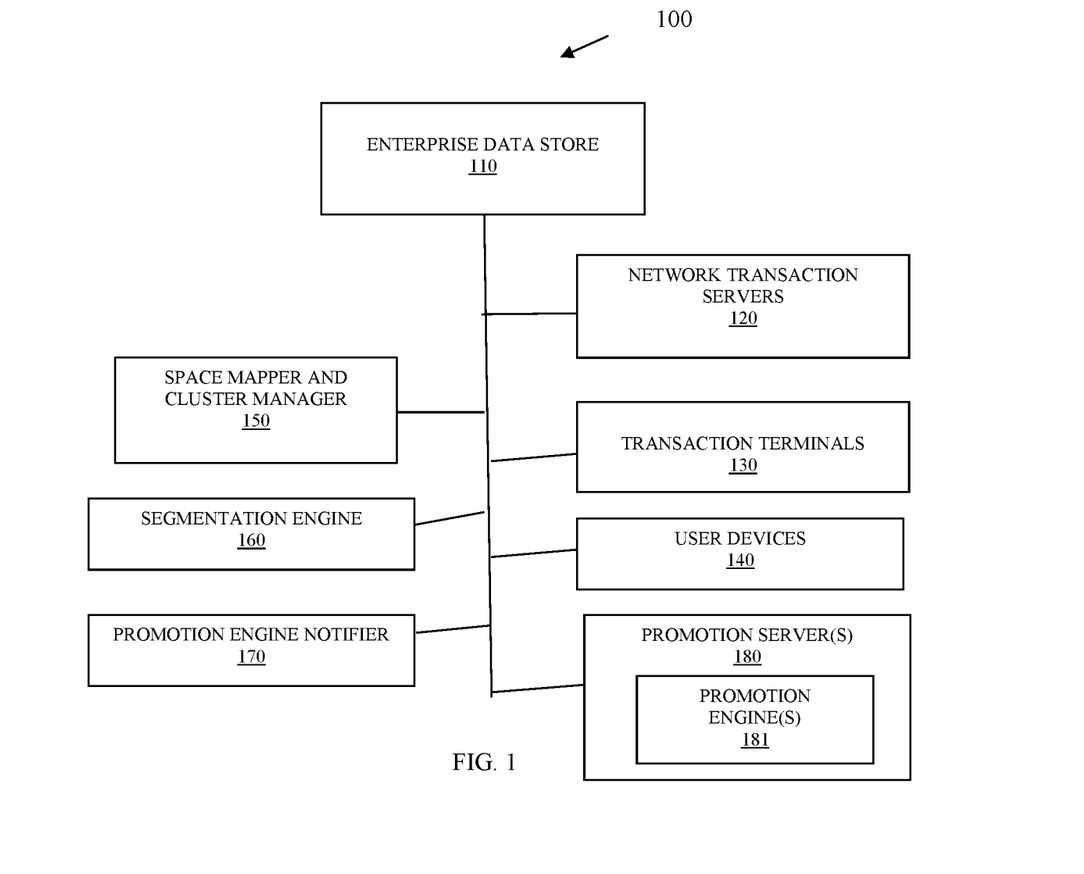
FIG. 1 is a diagram of a system for data-driven segmentation and clustering, according to an example embodiment.

FIG. 1 is a diagram of a system 100 for data-driven segmentation and clustering, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of data-driven segmentation and clustering presented herein and below.

The system 100 provides a mechanism by which item codes of a product catalogue are mapped to multidimensional space as item vectors representing contexts between each item code within multidimensional space. A consumer's transaction history is comprised of transactions, each transaction is comprised of the item codes representing the items of a given transaction. Each item code assigned to its own item vector. The sum of all item vectors for a transaction of a given consumer is calculated as an aggregate consumer-item vector. All consumer aggregate consumer-item vectors are mapped to multidimensional space. Distances between the aggregate consumer-item vectors identify relationships between the consumers based on each consumer's transaction history. A clustering algorithm is processed to cluster or group the consumers together based on the distances between each aggregate-consumer item vector. The resulting groups or clusters represent customer segments that identify through data-driven analysis customers that should be grouped together for purposes of promotions, marketing, and other customer-relationship management activities. Furthermore, as transaction histories and item purchases dynamically change for a given consumer, that consumer's aggregate consumer-item vector changes, which can result in that consumer being associated with a different cluster/group or segment.

The mechanisms provided herein and below create an enhanced customer segmentation tool that dynamically creates and establishes customer segments based on data derived relationships from each customer's transaction history. The resulting segments can be provided to promotion engines for processing to determine who should get promotions, at what time such promotions are optimally delivered, and what type of promotions are likely to be most successful for a given segment.

In an embodiment, a "Word2Vec" algorithms are deployed. Word2Vec is a group of algorithms used primarily in the field of natural language processing (NLP) for machine translation. Word2vec takes as its input a large corpus of text and produces a vector space, typically of several hundred dimensions, with each unique word in the corpus being assigned a corresponding vector in the space representing that words plotted position within the multidimensional space. Word vectors are positioned in the vector space such that words that share common contexts in the corpus are located in close proximity to one another in the space.

In an embodiment, a Word2Vec model is applied to a given retailer's catalog of products (items) using item codes as the corpus of text-based words. The "sentences" that would be provided as input would be the transactions. Each transaction is defined as a set of items—"words" (item codes). Embedding ~millions of catalog items into numeric vectors provides significant strength. Mathematical methods can be applied on the vectoral numeric representation of the catalog items to study the affinity between items and extract valuable information that can be monetized. The "Word2Vec" model is therefore leveraged to provide real-time product recommendations. One of the methods provided by "Word2Vec" model is that given a set of words, the model can assess the probability for any other word in the dictionary to appear in the same sentence as the given set of words. In the present modification, "Word2Vec" is adapted to a retailer's product catalog. Each item's context relative to the other items are defined as an item vector representing that item's locations within the multidimensional space. A consumer's transactions includes a plurality of individual item vectors. These item vectors are summed to obtain a single aggregate consumer-item vector. Every consumer of an enterprise has his/her aggregate consumer-item vector plotted in the multidimensional space and a K-means clustering algorithm is processed to cluster or group consumers together with one another in relationships. Each group comprises a plurality of customer identifiers representing the customers associated with that segment/group. Each group may also include a group identifier. The group identifiers and corresponding customer identifiers are provided as input to promotions engines or marketing applications.

The approaches herein do not require manual intervention and do not require predefined segments associated with manually-developed rules, as commonly needed today with conventional approaches, where analysts predefined customer segments and create rules that define how customers are to be assigned to the predefined segments.

The techniques provide data-driven customer segmentation and clustering tools/processes. It is data-driven because: no segment is assumed or predefined; there are no required rules for assigning a given customer to a segment, and segments change dynamically as transaction histories and items purchased change for each of the customers.

As used herein, the terms "consumer," "customer," or "shopper" may be used interchangeably and synonymously.

A "segment" is a group or a cluster of customers that are considered to be similar to one another based on their transaction histories. The segment may be represented as a segment identifier and a plurality of customer identifiers associated or related within the group/cluster to one another.

An "item code" represents an item from a given retailer's product catalogue. Each item code's affinity to the other item codes defines that item's vector in multidimensional space. The affinity and item code vector determined by Word2Vec algorithms based on analysis of the retailer's transaction histories and product catalogue. An "item vector" is a mathematical expression showing points within the multidimensional space representing the contexts of a given item.

An "aggregate consumer-item vector" is a sum of all item vectors for all items purchased by a consumer as identified in a corresponding consumer's transaction history for the retailer.

The system 100 includes, an enterprise data store 110, network transaction servers 120, a plurality of transaction terminals 130, user-operated devices 140, a space mapper and cluster manager 150, a segmentation engine 160, a promotion engine notifier 170, and one or more promotion servers 180 that execute one or more promotion engines 181.

Enterprise data store 110 includes a variety of enterprise data, such as transaction histories for transactions performed with a retailer. Other types of data may be included in enterprise data store 100 as well, such as incentives available to consumers, customer data for known customers, the transaction details for transactions of customers, and other information captured and retained by the enterprise for the store and other stores associated with the enterprise (retailer).

The space mapper and cluster manager 150, the segmentation engine 160, the promotion engine notifier 170, and promotion engines are executable instructions that reside in a non-transitory computer-readable storage medium. The executable instructions are executed by one or more hardware processors of computing devices. This causes the system 100 to perform the processing discussed herein and below for 150-170 and 181.

The network transaction servers 120 are web-based and/or mobile application (app)-based computing devices that process online transactions for consumers. As such, servers 120 include a variety of software and interfaces (transaction services) that permit consumers to shop with a given retailer online through user-devices 140. The transaction services are accessible via an Application Programming Interface (API) permitting real-time transaction details (such as item basket details) to be communicated in real-time during online consumer transactions to enterprise data store 110 for recordation. The API also permits promotion engine notifier 170 to relay recommendations for any changed customer segments associated with a given customer to be reported to promotion engines 181.

Transaction terminals 130 comprise a plurality of hardware devices that execute software as services provided throughout an enterprise over one or more networks (wired, wireless, or a combination of wired and wireless). Moreover, terminals 130 include a variety of integrated peripheral devices, such as and by way of example only, card readers (contact based or contactless), touchscreen display, keypad, receipt printer.

Transaction terminals 130 can be self-operated as SSTs (where consumers self-check out to conclude a transaction with a retailer) or can be POS terminals operated by cashiers of an enterprise to provide assisted check outs.

User-operated devices 140 can be any consumer-operated device, such as wearable processing devices, voice-enabled network appliances (Internet-of-Things (IoTs) devices), laptops, desktops, tablets, network-based vehicle-integrated devices, and others. Devices 140 utilize retailer-provided interfaces (web-based and/or app-based interfaces) to perform shopping and transaction basket checkouts with transaction services of network servers 120.

Initially, a product catalogue of a retailer comprises a plurality of item codes for products/items of the retailer. Transaction histories for transactions are expressed as a collection of words, each word representing an item code for a specific item associated with a given transaction. For example, a transaction comprising bread, milk, cheese, and eggs are assigned specific retailer item codes in accordance with that retailer's product catalogue as {0001, 2020, 3111, 4003}. Mapper 150 maps the item codes for the transaction into multidimensional space as item vectors based on the unique dimensions identified using a Word2Vec algorithm after deriving the dimensions based on the entire product catalogue. Assuming each point in the multidimensional space is expressed along 3 dimensions, each item code would then be transformed into three coordinates for example bread (item code 0001) may include coordinates as {0.12, 0.23, 0.56}. The collection of coordinates for each item in the transaction is expressed as a mathematical vector through the dimensions of the multidimensional space. For example, example item vectors for the bread, milk, cheese, and eggs transaction may appear as follows:

{0.12, 0.23, 0.56
0.64, 0.25, 0.72
0.42, 0.38, 0.56
0.72, 0.89, 0.04}

The transaction histories for the enterprise within the enterprise data store 110 are transformed into words (item codes) and coordinates that plot to the multidimensional space by mapper 150 based on the contexts for which the items were purchased (obtained from transactions). So, each item vector is a mapping of that item's contexts (based on the transaction history) identified through plotted points within the multidimensional space along the dimensions.

Space mapper and cluster manager 150 receives or obtains a customer identifier for a customer and a corresponding transaction history for that customer identifier from enterprise data store 110. Each transaction of that customer's transaction history comprises a plurality of item codes, each item code is assigned its corresponding item vector. The sum of all item vectors from that customer's transaction history is calculated as an aggregate consumer-item vector. Space mapper and cluster manager 150, iterates to a next customer identifier for a next customer of a retailer and generates that next customer's aggregate consumer-item vector. This continues for all customers of the retailer or for a set of provided customer identifiers. Again, each aggregate consumer-item vector represents points within the dimensions of the multidimensional space for each customer's item purchase history with the enterprise. Accordingly, each aggregate consumer-item vector provides a data-drive context of a given customer's item purchase history defined within the dimensions of the multidimensional space.

Segmentation engine 160 receives the aggregate consumer-item vectors and processes a clustering algorithm or machine-learning algorithm against the vectors as defined by the dimensions of the multidimensional space. In an embodiment, the clustering algorithm is a K-means. This results in affinity groups/clusters that assign a given aggregate consumer-item vector to one or more of the groups/clusters based on distances within the multidimensional space between the aggregated consumer-item vectors to one another. Segmentation engine 160 assigns group/cluster identifiers to the groups/clusters and associated the corresponding customer identifiers associated with the groups/clusters. Segmentation engine 160 then provides each group/cluster identifier along with the assigned customer identifiers to promotion engine notifier 170 as a customer segment (segment).

Promotion engine notifier 170 processes one or more API's to store the customer segment in enterprise data store 110 or dynamically communicate the customer segment directly to promotion engines 181. Promotion engines 181 uses the provided customer segments to run promotions and marketing campaigns directed to customers identified in the segments.

In an embodiment, a promotion engine 181 processes and API to make a request for a customer segment or set of customer segments through segmentation engine 160. The requests can include a single customer identifier or a set of customer identifiers. Segmentation engine 160 interacts with space mapper and cluster manager 150 to obtain the corresponding customer's aggregate consumer-item vectors and performs a machine-learning clustering algorithm to return assigned segments for the received customer identifier or set of customer identifiers.

In an embodiment, segmentation engine 160 and space mapper and cluster manager 150 perform segmentation based on an inputted period of time, such as 1 years' worth of customer transaction histories, etc.

In an embodiment, at preconfigured intervals of time, segmentation engine 160 and space and cluster manager 150 dynamically updates segments based on new transactions received from servers 120, terminals 130, and user devices 140 (all of which are record in data store 110).

In an embodiment, the promotions servers 180 may be associated with loyalty systems of retailers. Each loyalty system associated with a unique one of the retailers.

In an embodiment, segmentation engine 160 normalizes each item vector associated with each transaction from a given customer's transaction history before summing the item vectors into that customer's aggregate consumer-item vector.

In an embodiment, system 100 is cloud-based service that produces data-driven customer segments from a given-retailer's enterprise data store 100. Such that, there can be a plurality of enterprise data stores 110, each data store 110 associated with a given subscribing retailer to the cloud-based service.

System 100 allows for a numerical and mathematical representation of every customer of a retailer that defines that customer's item transaction history within the context of a vector. Machine-learning clustering algorithms identify relationships between each of the customers relative to one another by clustering each customer's corresponding aggregate consumer-item vector. This can be done based on a user-provided period of time. The resulting segments can be dynamically reported to promotion engines 181 for providing marketing campaigns and promotions directed to the data-driven segments produced.

These and other embodiments are now discussed with reference to the FIGS. 2-4.

Figure 2:
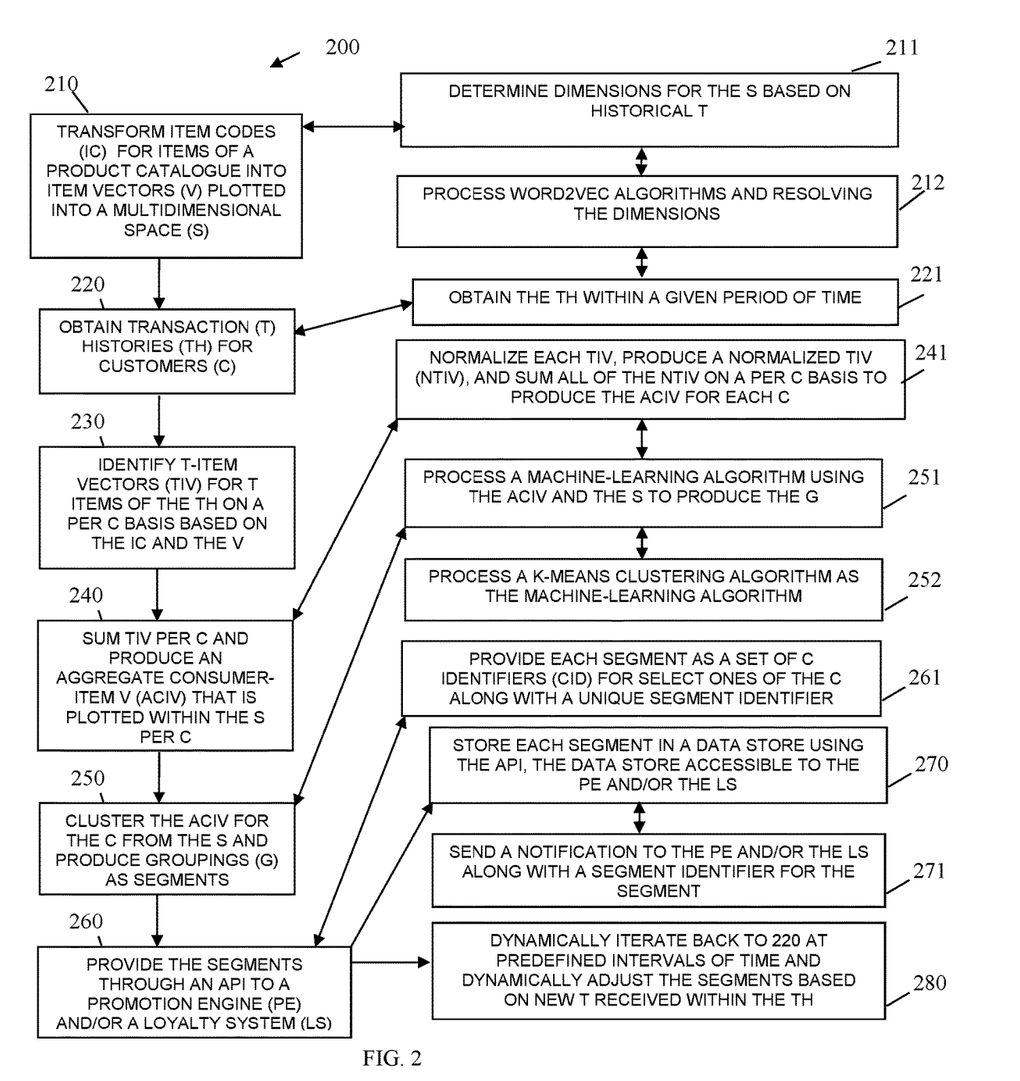
FIG. 2 is a diagram of a method for data-driven segmentation and clustering, according to an example embodiment.

FIG. 2 is a diagram of a method 200 for data-driven segmentation and clustering, according to an example embodiment. The software module(s) that implements the method 200 is referred to as a "data-driven segmentation manager." The data-driven segmentation manager is implemented as executable instructions programmed and residing within memory and/or a non-transitory computer-readable (processor-readable) storage medium and executed by one or more processors of a device. The processor(s) of the device that executes the data-driven segmentation manager are specifically configured and programmed to process the data-driven segmentation manager. The data-driven segmentation manager has access to one or more network connections during its processing. The network connections can be wired, wireless, or a combination of wired and wireless.

In an embodiment, the device that executes the data-driven segmentation manager is a server. In an embodiment, the server is a cloud processing environment that comprises multiple servers cooperating with one another as a single server. In an embodiment, the server is a Local Area Network (LAN) server.

In an embodiment, the device that executes the data-driven segmentation manager is a network-edge device that is local or on an edge of a LAN of a retail store.

In an embodiment, the data-driven segmentation manager is all of or some combination of: 150-170.

In an embodiment, the data-driven segmentation manager is provided as a SaaS to a plurality of enterprises, each enterprise having a subscription relevant to its customers and its provided transaction and customer data.

At 210, the data-driven segmentation manager transforms item codes for items of a product catalogue into item vectors plotted into a multidimensional space.

In an embodiment, at 211, the data-driven segmentation manager determines dimensions for the multidimensional space based on historical transactions associated with a given enterprise.

In an embodiment of 211 and at 212, the data-driven segmentation manager processes Word2Vec algorithms and resolves dimensions associated with the multidimensional space.

At 220, the data-driven segmentation manager obtains transaction histories for customers of a given enterprise.

In an embodiment, of 212 and 220, at 221, the data-driven segmentation manager obtains the transaction histories within a given period of time.

At 230, the data-driven segmentation manager identifies transaction-item vectors for transaction items of the transaction histories on a per customer bases based on the item codes and the item vectors transformed at 210.

At 240, the data-driven segmentation manager sums the transaction item vectors and produces aggregate consumer-item vectors that is plotted within the multidimensional space per customer. That is, each customer is represented as a unique numerical and mathematical aggregate consumer-item vector.

In an embodiment, at 241, the data-driven segmentation manager normalizes each transaction item vector, produces a normalized transaction item vector for each corresponding transaction item vector, and sums all the normalized transaction item vectors on a per customer bases to produce the aggregate consumer-item vector per customer.

At 250, the data-driven segmentation manager clusters the aggregate consumer-item vectors from the multidimensional space and produces groupings as segments.

In an embodiment of 241 and 250, at 251, the data-driven segmentation manager processes a machine-learning algorithm using the aggregate consumer-item vectors and the multidimensional space to produce the groupings.

In an embodiment of 251 and at 252, the data-driven segmentation manager processes a K-means clustering algorithm as the machine-learning algorithm.

At 260, the data-driven segmentation manager provides the segments through an API to a promotion engine and/or a loyalty system.

In an embodiment, at 261, the data-driven segmentation manager provides each segment as a set of customer identifiers for select ones of the customers along with a unique segment identifier.

In an embodiment, at 270, the data-driven segmentation manager stores each segment in a data store using the API. The data store accessible to the promotion engine and/or the loyalty system.

In an embodiment of 270 and at 271, the data-driven segmentation manager sends a notification to the promotion engine and/or the loyalty system along with a segment identifier for the segment.

In an embodiment, at 280, the data-driven segmentation manager dynamically iterates back to 220 at predefined intervals of time and dynamically adjusts the segments based on new transactions received within the transaction histories.

Figure 3:
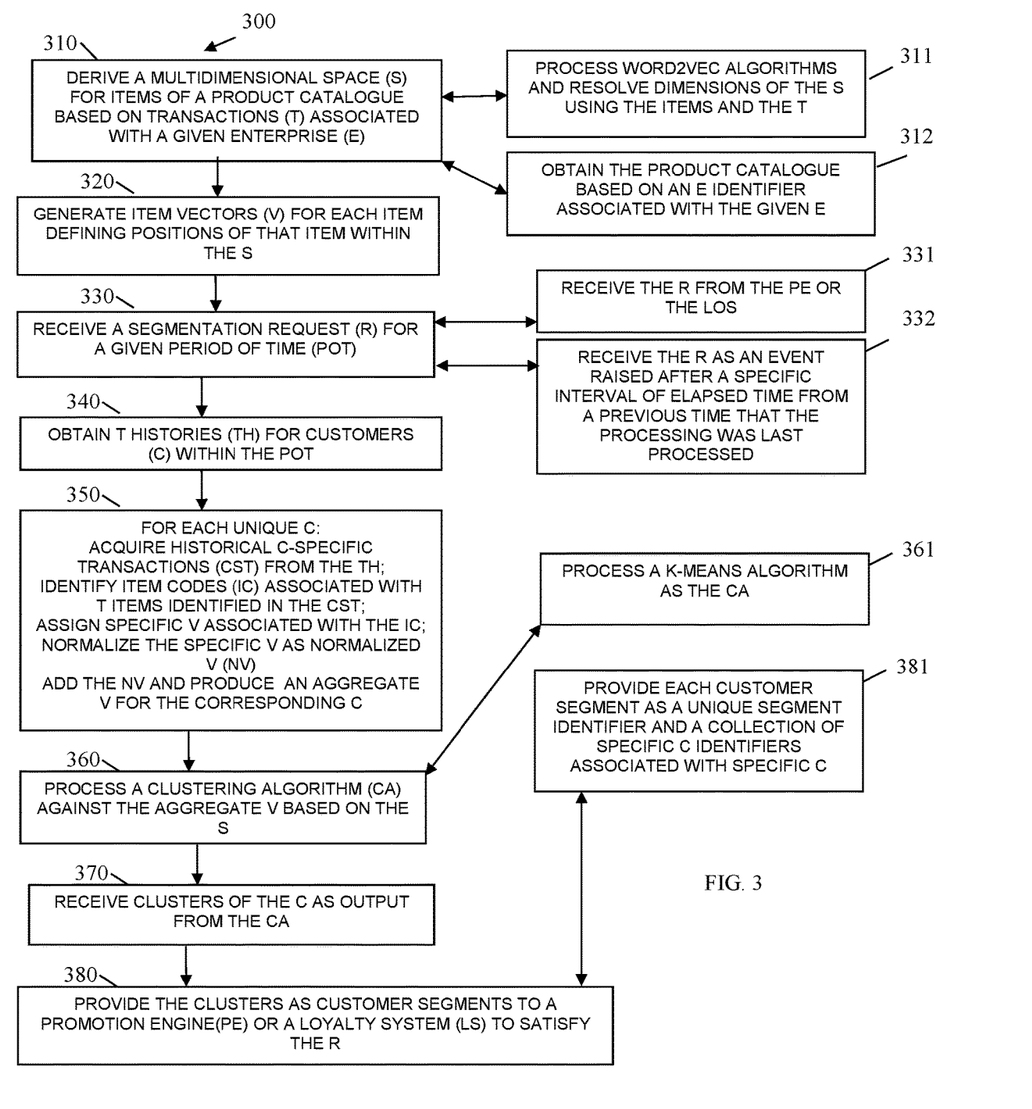
FIG. 3 is a diagram of another method for data-driven segmentation and clustering, according to an example embodiment.

FIG. 3 is a diagram of another method 300 for data-driven segmentation and clustering, according to an example embodiment. The software module(s) that implements the method 300 is referred to as a "customer segmentation manager." The customer segmentation manager is implemented as executable instructions programmed and residing within memory and/or a non-transitory computer-readable (processor-readable) storage medium and executed by one or more processors of a device. The processors that execute the customer segmentation manager are specifically configured and programmed to process the customer segmentation manager. The customer segmentation manager has access to one or more network connections during its processing. The network connections can be wired, wireless, or a combination of wired and wireless.

In an embodiment, the device that executes the customer segmentation manager is a server. In an embodiment, the server is a cloud processing environment that comprises multiple servers cooperating with one another as a single server. In an embodiment, the server is a LAN server that is local to a retail store.

In an embodiment, the device that executes the customer segmentation manager is a network-edge device that is on the edge of a LAN for a retail store.

In an embodiment, the customer segmentation manager is all or some combination of: 150-170, and/or the method 200.

The customer segmentation manager presents another and, in some ways, enhanced processing perspective to that which was described above with the FIG. 2.

At 310, the customer segmentation manager derives a multidimensional space for items of a product catalogue based on transactions associated with a given enterprise.

In an embodiment, at 311, the customer segmentation manager processes Word2Vec algorithms and resolves dimensions of the multidimensional space using the items and the transactions.

In an embodiment, at 312, the customer segmentation manager obtains the product catalogue based on an enterprise identifier associated with the given enterprise.

At 320, the customer segmentation manager generates item vectors for each item defining positions and contexts of that item within the multidimensional space relative to other items in the product catalogue.

At 330, the customer segmentation manager receives a segmentation request for a given period of time.

In an embodiment, at 331, the customer segmentation manager receives the segmentation request from an interface of or an API call from a promotion engine and/or a loyalty system.

In an embodiment, at 332, the customer segmentation manager receives the segmentation request as an event raised after a specific interval of elapsed time from a previous time that the customer segmentation manager was processed.

At 340, the customer segmentation manager obtains transaction histories for customers within the period of time.

At 350, the customer segmentation manager performs processing for each unique customer comprising: acquiring historical customer-specific transactions from the transaction histories; identifying item codes associated with transaction items identified in the customer-specific transactions; assigning specific item vectors associated with the item codes; normalizing the specific item vectors as normalized item vectors; and adding the normalized item vectors and producing an aggregate item vector for the corresponding unique customer.

At 360, the customer segmentation manager processes a clustering algorithm against the aggregate item vectors based on their plotted positions within the multidimensional space.

In an embodiment, at 361, the customer segmentation manager processes a K-means algorithm as the clustering algorithm.

At 370, the customer segmentation manager receives clusters of the customers as output from the clustering algorithm.

At 380, the customer segmentation manager provides the clusters as customer segments to a promotion engine or a loyalty system to satisfy the original segmentation request received back at 330.

In an embodiment, at 381, the customer segmentation manager provides each customer segment as a unique segment identifier and a collection of specific customer identifiers associated with specific ones of the customers.

Figure 4:
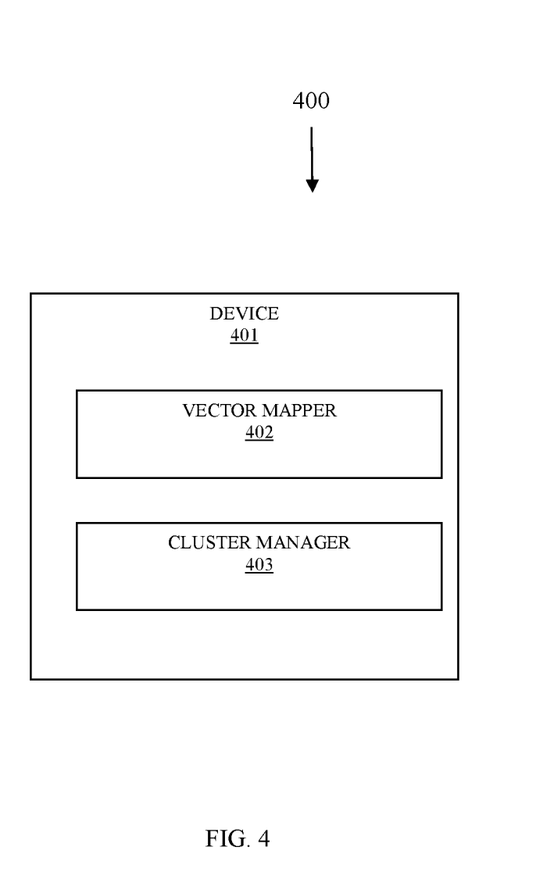
FIG. 4 is a diagram of another system for data-driven segmentation and clustering, according to an example embodiment.

FIG. 4 is a diagram of a system 400 for data-driven segmentation and clustering, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a processing device 401, a vector mapper 402, and a cluster manager 403.

In an embodiment, the processing device 401 is a server. In an embodiment, the server is a collection of servers that cooperate as a cloud processing environment.

The vector mapper 402 is a set of executable instructions that is executed on one or more hardware processors of the processing device 401 from a non-transitory computer-readable storage medium or memory.

The cluster manager 403 is also a set of executable instructions that is executed on one more hardware processors of the processing device 401 from a non-transitory computer-readable storage medium or memory.

The vector mapper 402, when executed by the processor(s) of the device 401, is configured to cause the processor to perform operations comprising: 1) creating item vectors based on a product catalogue of items, transactions comprising the items, and a derived multidimensional space; and 2) identifying transaction item vectors for a transaction history associated with a customer based on the items and the derived multidimensional space.

In an embodiment, the vector mapper 402 is the space and cluster manager 150.

The cluster manager 403, when executed by the processor(s) of the device 401, is configured to cause the processor to perform other operations comprising: 1) identifying a segmentation request with a given period of time; 2) obtaining transaction histories for customers for the given period of time; 3) using the vector mapper 402 to obtain transaction item vectors per customer; 4) normalizing the transaction item vectors and normalized item vectors per customer; 5) summing the normalized item vectors as an aggregated item vector per customer; 6) clustering the aggregated item vectors into groups; and 7) providing the groups as customer segments to a promotion engine or a loyalty system.

In an embodiment, the cluster manager 403 is all or some combination of: 150, 160, 170, the method 200, and/or the method 300.

In an embodiment, the segmentation request is one of: generated based on an elapsed period of time or received through an API from an interface associated with the promotion engine or the loyalty system.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
  providing executable instructions to a processor causing the processor to perform operations comprising:
    transforming item codes for items of a product catalogue into item vectors plotted into a multidimensional space and determining dimensions of the multidimensional space based on a total number of unique item codes detected in the product catalogue, and expressing each item vector as a collection of coordinates plotted within the dimensions of the multidimensional space, wherein each item vector plotted within the multidimensional space represents affinities between the corresponding item vector to remaining ones of the item vectors plotted within the multidimensional space;
    obtaining transaction histories for customers;
    identifying transaction item vectors for transaction items of the transaction histories on a per customer basis based on the item codes and the item vectors present in each transaction for the corresponding customer, and summing each corresponding item vectors present within a corresponding transaction to obtain each transaction item vector, wherein each customer associated with a plurality of transaction vectors, each transaction vector for the corresponding customer representing a specific transaction of the corresponding customer;

summing transaction item vectors per customer and producing an aggregate consumer-item vector that is plotted within the multidimensional space per customer, wherein each aggregate consumer-item vector represents the corresponding customer's transaction vectors, each transaction vector for the corresponding customer represents given items purchased by the corresponding customer in a given transaction;

clustering the aggregate consumer-item vectors for the customers from the multidimensional space and producing customer groupings as segments based on calculated distances within the multidimensional space between each aggregate consumer-item vector;

providing the segments through an Application Programming Interface (API) to a promotion engine or a loyalty system causing delivery of the customer promotions by the promotion engine or the loyalty system to select customers of select segments, providing further includes providing each customer's corresponding aggregate consumer-item vector as a numerical and mathematical context for evaluating the corresponding customer's transaction history; and processing the method as a Software as a Service from a cloud and providing the segments based on dynamic data-driven analysis to the promotion engine or the loyalty system through the API as data-driven segmentation for the customers defined in the segments and not in predefined rules managed by the promotion engine or the loyalty system, wherein no particular segment is predefined and wherein no rules are processed to assign a particular customer to a particular segment through the API, and wherein the segments change dynamically as changes are updated to the transaction histories for each customer.

2. The method of claim 1, wherein transforming further includes processing Word2Vec algorithms and resolving the dimensions.

3. The method of claim 2, wherein obtaining further includes obtaining the transaction histories within a given period of time.

4. The method of claim 1, wherein summing further includes normalizing each transaction-item vector, producing a normalized transaction-item vector, and sum all of the normalized transaction-item vectors on a per customer basis to produce the aggregate consumer-item vector for each customer.

5. The method of claim 4, wherein clustering further includes processing a machine-learning algorithm using the aggregate consumer-item vectors and the multidimensional space to produce the groupings.

6. The method of claim 5, wherein processing further includes processing a K-means clustering algorithm as the machine-learning algorithm.

7. The method of claim 1, wherein providing further includes providing each segment as a set of customer identifiers for select ones of the customers along with a unique segment identifier.

8. The method of claim 1 further comprising, storing each segment in a data store using the API, wherein the data store accessible to the promotion engine or the loyalty system.

9. The method of claim 8, wherein storing further includes sending a notification to the promotion engine or the loyalty system along with a segment identifier for the segment for retrieving the segment by the promotion engine or the loyalty system from the data store.

10. The method of claim 1 further comprising, dynamically iterating back to the obtaining at predefined intervals of time and dynamically adjusting the segments based on new transaction received within the transaction histories.

11. A method, comprising:
providing executable instructions to a processor causing the processor to perform operations comprising:
  deriving a multidimensional space for items of a product catalogue based on transactions associated with a given enterprise and determining dimensions of the multidimensional space based on a total number of unique item codes detected in the product catalogue;
  generating item vectors for each item defining positions of that item within the multidimensional space, and expressing each item vector as a collection of coordinates plotted within the dimensions of the multidimensional space, wherein each item vector plotted within the multidimensional space represents affinities between the corresponding item vector to remaining ones of the item vectors plotted within the multidimensional space;
  receiving a segmentation request for a given period of time;
  obtaining transaction histories for customers within the given period of time;
  for each unique customer:
    acquiring historical customer-specific transactions from the transaction histories;
    identifying item codes associated with transaction items identified in the historical customer-specific transactions;
    assigning specific item vectors associated with the item codes per transaction;
    summing the specific item vectors per transaction creating a transaction vector for each transaction for the corresponding customer;
    normalizing the transaction vectors as normalized item vectors; and
    summing the normalized item vectors associated with all the historical customer-specific transactions from the transaction histories and producing an aggregate consumer-item vector for the corresponding customer, and plotting the aggregate consumer-item vector within the multidimensional space, wherein each aggregate consumer-item vector represents the corresponding customer's transaction vectors, each transaction vector for the corresponding customer represents given items purchased by the corresponding customer in a given transaction;
  processing a clustering algorithm against the aggregate consumer-item vectors based on plotted aggregated consumer-item vectors within the multidimensional space;
  receiving clusters of the customers as output from the clustering algorithm based on calculated distances within the multidimensional space between each aggregate consumer-item vector; and
  providing the clusters as customer segments to a promotion engine or a loyalty system by identifying, determining and creating the customer segments based on data derived relationships from each customer's corresponding transaction history in response to segmentation requests requesting target customers in the customer segments for delivering customer promotions and times for delivering the customer promotions to each of the target customers identified in each of the customer segments, wherein providing further includes providing each customer's corresponding aggregate consumer-item vector as a numerical and mathematical context for evaluating the corresponding customer's transaction history; and processing the method as a Software as a Service to the promotion engine or the loyalty system from a cloud and through an Application Programming Interface and providing the customer segments based on dynamic data-driven analysis as data-driven segmentation for the customers defined in the customer segments and not in predefined rules managed by the promotion engine or the loyalty system, wherein no particular segment is predefined and wherein no rules are processed to assign a particular customer to a particular customer segment, and wherein the customer segments change dynamically as changes are updated to the transaction histories for each customer.

12. The method of claim 11, wherein deriving further includes obtaining the product catalogue based on an enterprise identifier associated with the given enterprise.

13. The method of claim 11, wherein receiving further includes receiving the segmentation request from the promotion engine or the loyalty system.

14. The method of claim 11, wherein receiving further includes receiving the segmentation request as an event raised after a specific interval of elapsed time from a previous time that the method was last processed.

15. The method of claim 11, wherein processing further includes processing a K-means algorithm as the clustering algorithm.

16. The method of claim 11, wherein providing further includes providing each customer segment as a unique segment identifier and a collection of specific customer identifiers associated with specific customers.

17. A system, comprising:
a processing device having at least one processor configured to execute instructions from a non-transitory computer-readable storage medium, the instructions representing a vector mapper and a cluster manager;
the vector mapper executed by the at least one processor causing the at least one processor to perform operations comprising:
creating item vectors based on a product catalogue of items, transactions comprising the items, and a derived multidimensional space and determining dimensions of the multidimensional space based on a total number of unique item codes detected in a product catalogue, and expressing each item vector as a collection of coordinates plotted within the dimensions of the multidimensional space, wherein each item vector plotted within the multidimensional space represents affinities between the corresponding item vector to remaining ones of the item vectors plotted within the multidimensional space; and identifying transaction item vectors for a transaction history associated with a customer based on the items and the derived multidimensional space, wherein each transaction item vector represents given items purchased by the corresponding customer in a given transaction;

the cluster manager is executed by the at least one processor to cause causing the at least one processor to perform other operations comprising:
identifying a segmentation request with a given period of time;
obtaining transaction histories for customers for the given period of time;
using the vector mapper to obtain transaction item vectors per customer by plotting each transaction item vector for a corresponding transaction of the customer as a sum of individual item vectors associated with the corresponding items of the corresponding transaction;
normalizing the transaction item vectors and normalized item vectors per customer;
summing the normalized item vectors as an aggregated item vector per customer;
clustering the aggregated item vectors into groups based on calculated distances between each plotted aggregated item vector within the multidimensional space, wherein each aggregate item vector represents the corresponding customer's transaction vectors;
providing the groups as customer segments to a promotion engine or a loyalty system causing the customer promotions to be delivered by the promotion engine or the loyalty system to select customers of select customer segments, wherein providing further includes providing each customer's corresponding aggregate item vector as a numerical and mathematical context for evaluating the corresponding customer's transaction history; and
processing the cluster manager as a Software as a Service to the promotion engine or the loyalty system from a cloud and through an Application Programming Interface (API) and providing the customer segments based on dynamic data-driven analysis as data-driven segmentation for the customers defined in the customer segments and not in predefined rules managed by the promotion engine or the loyalty system, wherein no particular segment is predefined and wherein no rules are processed to assign a particular customer to a particular customer segment, and wherein the customer segments change dynamically as changes are updated to the transaction histories for each customer.

18. The system of claim 17, wherein the segmentation request is:
generated based on an elapsed period of time or received through the API from an interface associated with the promotion engine or the loyalty system.

* * * * *